United States Patent
Ranganathan et al.

(10) Patent No.: US 11,196,631 B2
(45) Date of Patent: Dec. 7, 2021

(54) MULTI-UNICAST DISCOVERY OF DEVICES ON A NETWORK

(71) Applicant: SLING MEDIA PVT LTD, Bangaluru (IN)

(72) Inventors: Gopikumar Ranganathan, Madurai (IN); Jayaprakash Narayanan Ramaraj, Bangaluru (IN)

(73) Assignee: SLING MEDIA PVT LTD, Bangaluru (IN)

( * ) Notice: Subject to any disclaimer, the term of this patent is extended or adjusted under 35 U.S.C. 154(b) by 0 days.

(21) Appl. No.: 16/369,428

(22) Filed: Mar. 29, 2019

(65) Prior Publication Data
US 2020/0213200 A1 Jul. 2, 2020

Related U.S. Application Data

(60) Provisional application No. 62/786,833, filed on Dec. 31, 2018.

(51) Int. Cl.
*H04L 12/24* (2006.01)
*H04L 29/06* (2006.01)
*H04L 12/741* (2013.01)

(52) U.S. Cl.
CPC ............. *H04L 41/12* (2013.01); *H04L 45/74* (2013.01); *H04L 65/4076* (2013.01); *H04L 65/4084* (2013.01); *H04L 69/165* (2013.01)

(58) Field of Classification Search
CPC . H04L 41/12; H04L 65/4084; H04L 65/4076; H04L 69/165; H04L 45/74
See application file for complete search history.

(56) References Cited

U.S. PATENT DOCUMENTS

| | | | | |
|---|---|---|---|---|
| 7,675,857 | B1* | 3/2010 | Chesson | H04L 47/26 370/235 |
| 2003/0120917 | A1 | 6/2003 | Itonaga et al. | |
| 2004/0267876 | A1* | 12/2004 | Kakivaya | H04L 67/16 709/200 |
| 2005/0108331 | A1* | 5/2005 | Osterman | H04L 29/06 709/204 |
| 2005/0195774 | A1 | 9/2005 | Chennikara et al. | |

(Continued)

*Primary Examiner* — Philip C Lee
*Assistant Examiner* — James Ross Hollister
(74) *Attorney, Agent, or Firm* — Lorenz & Kopf, LLP

(57) ABSTRACT

Client and server devices identify each other over a LAN or similar network through a series of unicasts. Rather than broadcasting a service announcement or discovery request as a broadcast or multicast, for example, a device instead transmits a series of unicast messages using a finite set of recipient network addresses and port numbers. Responses to the unicast messages can be collected and tracked to thereby allow subsequent communications to occur via unicasts with only the recognized addresses, with a multicast to only the recognized addresses, and/or otherwise as desired. By allowing the clients and servers to communicate with a finite set of unicast messages, a "broadcast" type message can be sent on the network without a need for router configuration. Moreover, unicasts can be sent using different protocols (e.g., TCP) than the subsequent traffic (e.g., UDP), thereby making discovery of compatible devices on the network more reliable.

15 Claims, 2 Drawing Sheets

(56) References Cited

U.S. PATENT DOCUMENTS

| | | | |
|---|---|---|---|
| 2006/0282544 A1* | 12/2006 | Monteiro | H04L 29/06 |
| | | | 709/231 |
| 2007/0097969 A1* | 5/2007 | Regnier | H04L 41/00 |
| | | | 370/390 |
| 2007/0168523 A1 | 7/2007 | Jiang et al. | |
| 2007/0195760 A1* | 8/2007 | Rahman | H04W 48/18 |
| | | | 370/389 |
| 2007/0250590 A1 | 10/2007 | Flannery | |
| 2008/0072041 A1 | 3/2008 | Na | |
| 2009/0135740 A1 | 5/2009 | Dhara et al. | |
| 2009/0147718 A1 | 6/2009 | Liu et al. | |
| 2009/0168775 A1 | 7/2009 | Lin et al. | |
| 2010/0315972 A1* | 12/2010 | Plotnik | H04L 67/125 |
| | | | 370/254 |
| 2011/0150432 A1 | 6/2011 | Paul et al. | |
| 2011/0153718 A1 | 6/2011 | Dham et al. | |
| 2012/0155248 A1 | 6/2012 | Na | |
| 2012/0173704 A1* | 7/2012 | Lingen | H04L 41/0873 |
| | | | 709/224 |
| 2014/0173108 A1* | 6/2014 | Lee | H04L 12/413 |
| | | | 709/224 |
| 2015/0006746 A1 | 1/2015 | Lucas et al. | |
| 2016/0198021 A1* | 7/2016 | Mooney | H04L 69/24 |
| | | | 370/467 |
| 2017/0237668 A1 | 8/2017 | Hall et al. | |
| 2018/0083857 A1* | 3/2018 | Oztaskent | H04L 41/12 |
| 2018/0102965 A1 | 4/2018 | Hari et al. | |
| 2020/0045089 A1* | 2/2020 | Warrick | H04L 41/0816 |

* cited by examiner

MULTI-UNICAST DISCOVERY OF DEVICES ON A NETWORK

PRIORITY CLAIM

This application claims priority to U.S. Provisional Application Ser. No. 62/786,833 filed on Dec. 31, 2018, which is incorporated herein by reference.

TECHNICAL FIELD

This application relates to data communications on a digital network. More particularly, the following discussion generally relates to discovery of devices that communicate on a digital network. Various embodiments may be used in connection with media players, digital video recorder (DVR) devices, video game players and/or any other devices that interoperate with other devices on a network.

BACKGROUND

Viewers now obtain television and other media content from a wide array of devices and sources. Media streaming is increasingly replacing broadcast television, for example, and time and place shifting devices are becoming increasingly common in homes, offices and other settings. The digital video recorder (DVR), for example, allows television viewers to record television programming or other content for viewing at a later time. Place shifting devices allow live and/or pre-recorded programs to be encoded for efficient delivery over local and/or wide area networks for viewing on a phone, tablet, computer or other device at a remote location from the place that the content is received or stored. Other media devices that are becoming increasingly commonplace include streaming media receivers and video game players, as well as set top boxes (STBs) and other receivers for terrestrial, cable, internet and/or direct broadcast satellite (DBS) television programming. Computers (including mobile phones, tablets and other portable computers) can also act as media devices.

As homes, offices and other environments incorporate more and more media devices, the need increases for these devices to interoperate over local and wide area networks. To provide just one example, various types of home media servers are now designed to reside on a home network and to interact with other devices that are also residing on the same LAN or other home-type network. Various media streaming devices, for example, can be connected to a user's home LAN to receive broadcast or other media content that is then placeshifted or otherwise retransmitted as a media stream over the LAN to a phone, tablet, computer or other client device for playback to a viewer. The AirTV products available from Dish Network LLC of Engelwood, Colo., for example, receive broadcast or other television content that can be streamed to a mobile phone, tablet, computer or other playback device via a local and/or wide area network.

Often, media devices locate each other on the local area or other network through broadcast or multicast discovery messages. Occasionally, however, router configuration or other factors can limit broadcasts on the network, thereby making broadcast discovery difficult (if not impossible) unless the user changes the configuration of the router. Router configuration varies substantially from router-to-router and network-to-network, however, and troubleshooting router configuration issues can be a substantial challenge for even the most sophisticated users. For most home users, the challenge of diagnosing and repairing router configuration and other network communications issues is daunting, to say the least.

It is therefore desirable to create devices, systems and processes to effectively yet efficiently allow computing devices to discover each other and to otherwise communicate effectively over a LAN or other home-type network. Other desirable features and characteristics will become apparent from the subsequent detailed description and the appended claims, taken in conjunction with the accompanying drawings and this background section.

BRIEF SUMMARY

According to various examples, client and server devices identify each other and communicate with each other over a LAN or similar home-type environment through a series of unicast messages rather than a broadcast message. Rather than broadcasting a service request on a LAN, for example, a client device could instead transmit a series of unicast messages using a finite set of recipient addresses and/or port numbers. Responses to the unicast messages can be collected and tracked to thereby allow subsequent communications to occur via unicasts (or multicasts) with only the recognized addresses, and/or otherwise as desired. By allowing the client to communicate with a finite set of unicast messages, a "broadcast" type message can effectively be sent on the network without a need for specialized router configuration or the like.

More specifically, various embodiments relate to automated processes performed by a digital processor of a client device to establish electronic communications with a server device operating on a common network with the client device, the automated process comprising: initially locating the server device by transmitting, from the client device, a series of unicast messages on the common network, wherein each of the series of unicast messages is sent to a different address on the common network; receiving, by the client device, a response to the series of unicast messages from the server device, wherein the server device operates on the common network using one of the different addresses on the common network, and wherein the response identifies the address on the common network of the server device; and subsequently communicating with the server device on the common network using the identified address on the common network. In some embodiments, the series of unicast messages is sent according to a first protocol (e.g., TCP) to permit more reliable transmission on the network, and the subsequently communicating comprises transmitting messages from the client device to the server device according to a second protocol (e.g., UDP) that is different from the first protocol for more efficient communication.

Other embodiments relate to client devices comprising: a hardware interface to communicate via a network, wherein the network is configured with a finite set of addresses assignable to nodes communicating via the network; a memory configured to store computer-executable instructions; and a processor configured to execute the computer-executable instructions stored by the memory to: initially locate the server device by transmitting, from the client device, a series of unicast messages on the network, wherein each of the series of unicast messages is sent to a different one of the finite set of addresses; receive, by the client device, a response to the series of unicast messages from the server device, wherein the server device operates on the common network using one of the different addresses on the network, and wherein the response identifies the address on the common network of the server device; and subsequently communicate with the server device on the common network using the identified address on the common network. Again, in some embodiments, the series of unicast messages is sent according to a first protocol (e.g., TCP) to permit more reliable transmission on the network, and the subsequently communicating comprises transmitting messages from the client device to the server device according to a second protocol (e.g., UDP) that is different from the first protocol for more efficient communication.

Still other embodiments relate to data processing systems, devices and automated processes substantially as described herein.

DRAWING FIGURES

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

Figure 1:
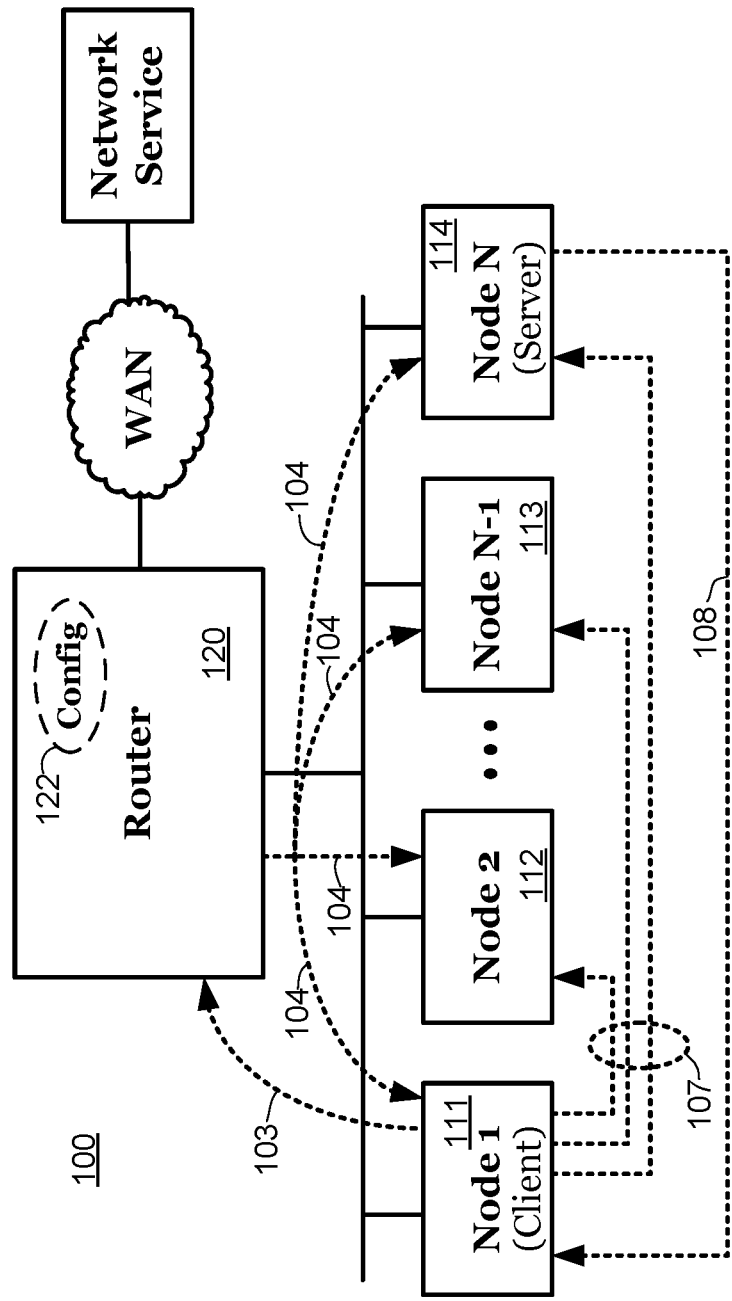
FIG. 1 illustrates an example of a data processing system 100 in which devices automatically detect other devices on a network by transmitting and/or receiving multiple unicast messages.

According to various example embodiments, a client and/or server device replaces broadcast messages on a LAN or similar network with a series of unicast messages sent to a finite address space. The address space on a typical LAN is often constrained to no more than several hundred addresses or so. A conventional IP network, for example, often allows only a limited number of unique addresses corresponding to the number of bits used in an address space. In traditional internet protocol (IP) routing, routers often default to a "192.128.0.x" address space for the local area network, with the "x" taking a value between 0 and 255, as represented by eight digital bits. In a frequent configuration, the "0" address is reserved on the network, the "1" address is assigned to a port on the router, and the "255" address is assigned as a network broadcast address. At most, then, 253 additional addresses remain on the network in this example. If a device learns its own address (e.g., 192.128.0.2 in the example of FIG. 1), then only 252 other potential addresses remain. Other examples may use different addresses and assignment schemes, but the point remains that the address space is limited in number. Put another way, the number of potential recipient addresses is a finite number, typically on the order of several hundred possible addresses.

Conventionally, a client 111 starting up on a network 102 could transmit a broadcast request message 103 on the network 102 to find its intended service. A web browser executing on a device, for example, may wish to establish itself as a client for media streaming, or another function. In this example, the browser would typically execute a plugin, JavaScript or similar code, and/or the like to transmit a broadcast (or, equivalently, a multicast) message 103 on the network 102 to locate a compatible server node. Broadcast 103 could be sent using the user datagram protocol (UDP), for example, if the router allows transmission of UDP broadcasts on that network. This broadcast 103 would be received by the router 120, which would then retransmit (or otherwise allow) the broadcast message 104 to be simultaneously sent to all of the nodes 111-114 operating on network 102. If the configuration 122 of router 120 is not set to allow broadcasts 104, however, or if broadcasts 104 are otherwise limited on network 102, then the broadcast 103 from client node 111 will not work, and client 111 will have substantial challenges in recognizing servers on network 102. Multicast messages (in which multiple transmission control protocol (TPC) and/or UDP messages are sent to a subset of the address space) may be similarly unavailable on many networks due to router configuration, difficulties in subscribing client devices, and/or other issues as appropriate.

As noted above, many browsers, client devices and/or router/gateway devices are configured to prevent broadcasts or multicasts of certain protocols, including UDP, for security reasons. That is, UDP broadcasts are often used by malicious software to locate other hosts on the network 103, so many networked devices disallow all UDP broadcasts/multicasts as a matter of policy. Devices that rely upon such broadcasts are therefore hampered unless the router is reconfigured to allow such traffic on the LAN.

Rather than relying upon broadcasts 103/104, client 111 could instead transmit a series of unicast messages 107 to different addresses on the network. To continue the example above, a node 111 seeking to discover a service could ensure that it contacts every other node on network 102 if it transmits unicast messages to every address in the space 192.128.0.3 through 192.128.0.254. This would, of course, create additional traffic on network 102 in comparison to a single broadcast 104. Indeed, this extraneous traffic is contrary to typical TCP/IP notions about congestion, bandwidth conservation and packet storm avoidance. In practice, however, the traffic can be manageable in certain situations, especially if the messages are relatively short in duration. Additionally, the unicast messages can be staggered or otherwise scheduled over a period of time (e.g., with delay between unicasts) to reduce packet collisions and to avoid choking of traffic on network 102. In various further embodiments, the unicast messages 107 are sent using the transmission control protocol (TCP) rather than UDP so that delivery is even less likely to be blocked by the router or another security device on network 103. To reiterate, then, the general concerns about excess traffic can be tempered through the use of TCP (or similar) protocols, along with appropriate configuration of packet sizes and/or transmission schedules. Limiting discovery packets to just a few bytes (e.g., fewer than about 25 bytes or so) can be very helpful, as can staggering the transmissions so that time gaps are present between messages.

Nodes receiving and recognizing the unicasts 107 may send response messages 108 as appropriate. The client node 111 can receive and recognize these responses to identify relevant server nodes on network 102 so that future communications can be limited to only the relevant nodes, as desired. A video client device 111, for example, could initially transmit unicasts 107 to each of the addresses available on network 102 before awaiting replies 108 on the network from video streaming services (e.g., node 114 in the example of FIG. 1). Conversely, a server device 114 could attempt to announce to all client nodes (e.g., node 111, 112, 113 in FIG. 1) using equivalent concepts. That is, a server device 114 could use a series of unicasts messages directed to the nodes in the finite address space to announce its presence on the network. Any client and/or server nodes on a network can therefore replace broadcasts with multiple unicasts to discover other compatible nodes in any manner. After one or more compatible nodes are discovered by the requesting node, subsequent communications could be sent only to the node(s) that respond, as desired.

Further embodiments could use the sequence of unicasts only as a fallback after attempting an unsuccessful broadcast (e.g., device 111 first transmits a broadcast request 103 and only resorts to unicasts 107 if no broadcast 104 is produced, or if no response is received to broadcast 104). Still other embodiments could attempt to reduce traffic on network 102 by initially listening for other nodes on network 102, and directing unicasts to addresses that are identified. That is, if only five other nodes are actively transmitting on the network 102, device 111 may recognize the addresses of these five nodes from other messages on the network, and target unicast messages only to the recognized addresses. Still further embodiments may recognize when new nodes appear on the network and target the new nodes with a unicast message some time after they appear. Additional features and enhancements may be considered in a wide array of equivalent embodiments.

Nodes 111-114 may be any sorts of devices that are able to communicate on network 102. Note that reference is occasionally made herein to "AirTV", "AirTV Classic" or "AirTV Classic Box" devices that are available from Dish Network of Englewood, Colo. These references are simply examples, however; equivalent concepts could be implemented in any number of other devices or systems, as noted herein. "Client" and "server" devices described herein are any network-enabled computing devices each operating under the control of computing hardware, such as any sort of processor, digital storage (e.g., solid state memory, or any sort of magnetic or optical storage) and input/output interfaces (e.g., network interfaces, interfaces to displays or input devices, etc.). Such devices will also incorporate an operating system or the like that allows applications to make use of the device's hardware resources to perform various tasks and functions. A video player application, for example, may be implemented using computer-executable instructions that are stored in memory or mass storage for automatic execution by the processor. Similarly, a client application residing in storage on the client may be executed by the client's processor to automatically initiate unicast messages and to handle any responses, as described more fully below. Other embodiments could be formulated in any number of alternate but equivalent embodiments.

Network 102 is any sort of local area network (LAN) or the like that is capable of supporting data communications with any number of home-type devices. Network 102 may be any sort of wired and/or wireless network, as desired. In various embodiments, network 102 includes one or more "ETHERNET" type networks (see IEEE 802.11 standards), one or more "WIFI" or similar wireless networks (see IEEE 802.4 standards), one or more multimedia over coaxial cable (MoCA) networks, and/or the like. Equivalent embodiments could use any other wireless and/or wired network topologies or standards that have multiple nodes communicating within a finite address space.

Figure 2:
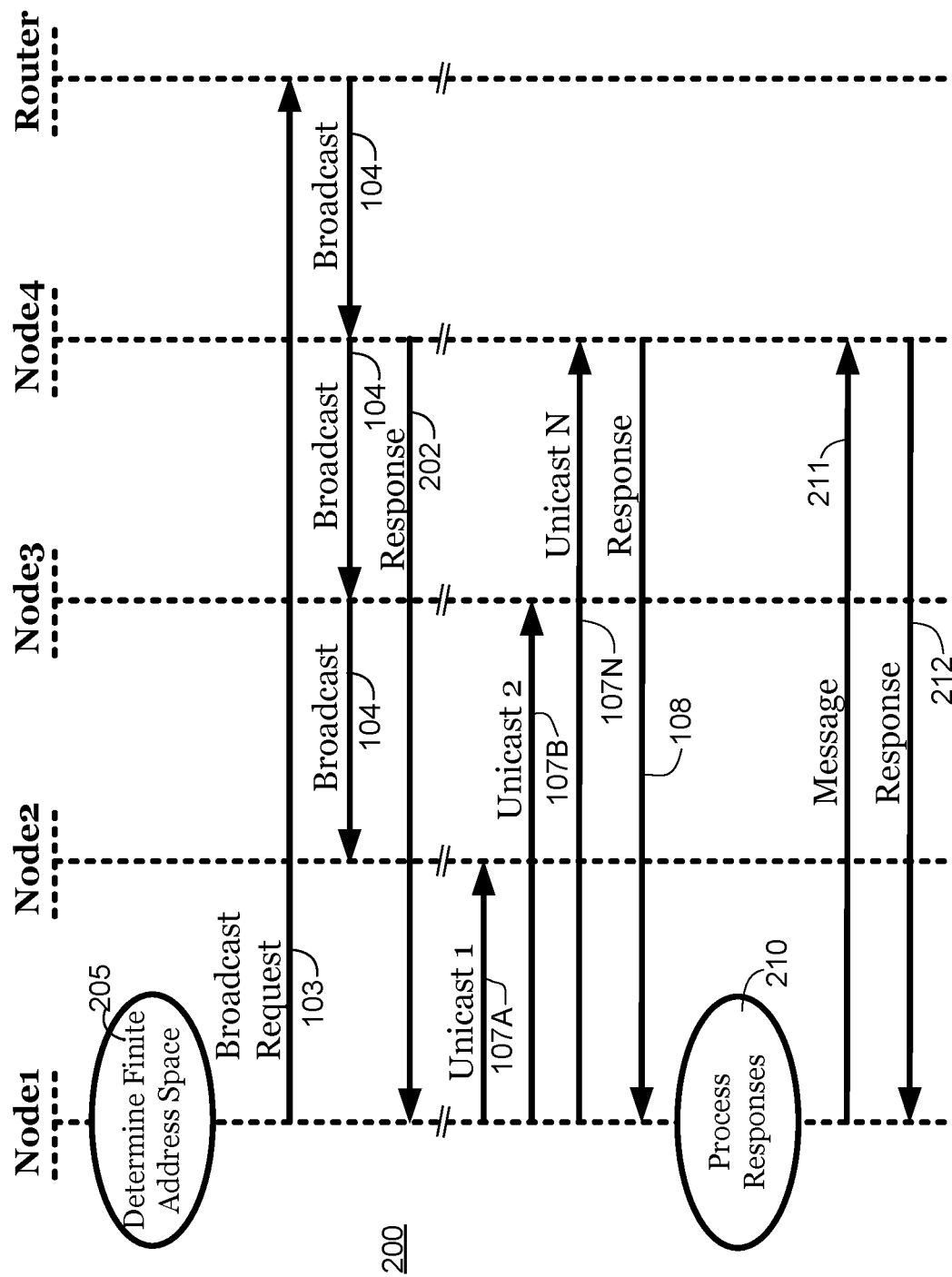
FIG. 2 is a diagram showing various example processes to automatically detect other devices on a network by transmitting and/or receiving multiple unicast messages.

FIG. 2 is a diagram showing various automated processes 200 executed by the nodes 111-114 of network 102 to discover other compatible nodes through a series of unicast messages. The various functions and messages shown in FIG. 2 are typically implemented by computing hardware within the device, typically under the control of programmed software and/or firmware logic that can be stored in memory or other non-transitory storage of the device. Each node typically communicates via LAN or another network 102, as described above, using a hardware interface such as a MoCA interface, an ETHERNET interface, a WIFI interface and/or the like. Each node 111-114 typically includes hardware interfaces to a display, keyboard, touchscreen and/or other input/output hardware as appropriate.

As noted in FIG. 2, a computer node 111 could conventionally transmit a broadcast request 103 that is received by router 120 and rebroadcast (or multicast) on the network as a single message 104 to be simultaneously received by other nodes 112-114, regardless of their address on the network. If broadcasts are allowed on the network, then receiving nodes can respond to the broadcast with a suitable response message 202 that is sent directly to the sender 111. If broadcast messages for one or more protocols (e.g., UDP) are blocked or otherwise not enabled on the network, however, then a node 111 can identify other compatible nodes by transmitting a series of unicast messages 107A-N, as described above. That is, the originating node 111 can transmit a separate unicast message 107A-N to each of the addresses in the finite address space of the network, thereby ensuring that any nodes operating on the network are contacted.

The finite address space of 102 can be determined in any manner (function 205). In various embodiments, the address space can be readily deduced from the seeking node's own address, which is typically assigned from router 120. Router 120 typically provides each node on the network with a suitable address, as well as the address of the router itself. Although the examples described herein often refer to Internet Protocol (IP) addresses in the form of x.x.x.x, in practice any other address formats (e.g., IPv6 or the like) could be equivalently used. Address information 124 could also include port numbers or similar constructs, as appropriate.

Often, the addresses of the device and the router are similar, with at least three of the four address bytes being identical. The byte(s) that differ between the router address and the node address can typically be assumed to be reserved for other nodes on network 102, so these addresses can typically make up the finite address space used to seek out compatible other nodes on the network 102. More complicated network schemes involving subnets, masks and other features can also be accommodated, if desired, as can longer or more complex addresses.

The service-seeking unicasts 107A-N may be sent to a predetermined port number, if desired, such as a port number that is hardcoded or otherwise configured within a media player or other application executing on the seeking node 111. Other embodiments may transmit additional unicasts to different port numbers, if desired.

Compatible nodes 112-114 receiving a unicast 107 can respond as desired. In various embodiments, the response message 108 sent by the compatible node 114 will include the address of the compatible node so that subsequent communications 211 from the seeking node 111 to the compatible node can be sent directly, without the need for additional seeking. Moreover, once the compatible node is identified, subsequent communications 211, 212 may be sent using different network protocols or formats, as desired. In some implementations, multiple receiving nodes 112-114 will be compatible so that each compatible node 112-114 will send a separate response message 108.

Compatible nodes 112-114 receiving a unicast 107 can respond as desired, and responses 108 to the unicasts 107 are processed as appropriate (function 210). In various embodiments, responses 108 can be logged or otherwise tracked by device 111 for subsequent communications. In various embodiments, the response message 108 sent by the compatible node 114 will include the address of the compatible node so that subsequent communications 211 from the seeking node 111 to the compatible node can be sent directly, without the need for additional seeking. Moreover, once the compatible node is identified, subsequent communications 211, 212 may be sent using different network protocols or formats, as desired.

In various embodiments, unicast messages 107 and/or response messages 108 may be formatted and transmitted as TCP messages, if desired, thereby improving the likelihood of delivery on network 102. Subsequent messages 211, 212 used to communicate between nodes 111-114 after the devices have discovered each other on the network 102 may nevertheless take place via UDP or other protocols, if desired. This technique of discovering nodes via a series of TCP unicasts rather than a conventional UDP broadcast or multicast can greatly improve network discovery of compatible nodes without substantially increasing the traffic on the network. In contrast to conventional network discovery schemes, then, reliable TCP messages can be used to identify compatible services, while retaining the benefits of UDP for subsequent communications after the server address has been identified on the network. Benefits of UDP over TCP can include, for example, reduced latency and improved tolerance of lost packets.

As noted above, the "requesting" node 111 may be a client device that is seeking a server on the network 102, and/or a server device that is making itself available to clients on the network 102. Generally, client nodes 111 can be programmed to seek services that respond on a predetermined port number so that only the particular address of the server is unknown. In other embodiments, unicasts could be sent to multiple port numbers in addition to and/or in place of multiple addresses. Other scenarios for network discovery and/or interaction could be formulated across a wide array of equivalent embodiments.

Although the network environment is often described herein as a "home" environment, equivalent concepts could be applied to offices, schools, factories, restaurants and bars, and/or any number of other environments that make use of multiple local area networks. Moreover, the concepts described herein with respect to contacting devices to establish video streaming could be equivalently applied for other applications or purposes, such as internet television (IPTV), video gaming, time and/or place shifting, home or office control, file or print sharing and/or any other applications as desired.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process performed by a digital processor of a client device to establish electronic communications with a server device operating on a common network with the client device, the automated process comprising: initially locating the server device by transmitting, from the client device, a series of 252 unicast messages on the common network, wherein a finite number of exactly 253 different addresses is available to nodes on the common network, wherein one of the 253 different addresses is assigned to the client device, and wherein the client device transmits one of the series of 252 different unicast messages to each of the different addresses available to other nodes on the common network using a common predetermined port number that is associated with the server device; receiving, by the client device, a response to at least one of the series of 252 unicast messages from the server device, wherein the server device operates at the predetermined port number on the common network using one of the different addresses on the common network, and wherein the response identifies one of the 253 different addresses on the common network used by the server device; and subsequently communicating with the server device on the common network using the identified address on the common network.

2. The automated process of claim 1 wherein the series of unicast messages is sent according to a first protocol, and wherein the subsequently communicating comprises transmitting messages from the client device to the server device according to a second protocol that is different from the first protocol.

3. The automated process of claim 2 wherein the first protocol is transmission control protocol (TCP) and wherein the second protocol is user datagram protocol (UDP).

4. The automated process of claim 1 wherein the initial locating comprises the client device delaying transmission of at least some of the series of unicast messages to prevent congestion of the network.

5. The automated process of claim 1 further comprising the client device transmitting a broadcast message on the network prior to transmitting the series of unicast messages, wherein the series of unicast messages are initiated upon failure to receive a broadcast response from the server device in response to the broadcast message.

6. The automated process of claim 1 further comprising the client device determining the series of different addresses from a node address of the client device.

7. The automated process of claim 1 wherein the server device is a source of video streaming content, and wherein the client device is a computing device executing a media player application on the processor.

8. A client device comprising: a hardware interface to communicate via a network, wherein the network is configured with a finite set of exactly 253 addresses assignable to nodes communicating via the network, wherein one of the 253 IP addresses is assigned to the client device; a memory configured to store computer-executable instructions; and a processor configured to execute the computer-executable instructions stored by the memory to: initially locate a server device operating on the network by transmitting, from the client device, a series of unicast messages on the network, wherein each of the series of unicast messages is sent to a different one of the finite set of 253 addresses but to a predetermined port number that is associated with the server device, and wherein the client device transmits a different one of the unicast messages to each of the 252 addresses in the finite set of addresses that is available to other nodes communicating via the network; receive, by the client device, a response to the series of 252 unicast messages from the server device, wherein the server device operates on the common network using one of the different addresses on the network and wherein the server device is configured to respond to messages received on the predetermined port number, and wherein the response identifies one of the finite set of addresses on the common network that is used by the server device; and subsequently communicate with the server device on the common network using the identified address on the common network.

9. The client device of claim 8 wherein the series of unicast messages is sent according to a first protocol, and the subsequent communication comprises transmitting messages from the client device to the server device according to a second protocol that is different from the first protocol.

10. The client device of claim 9 wherein the first protocol is transmission control protocol (TCP) and wherein the second protocol is user datagram protocol (UDP).

11. The client device of claim 8 wherein the network is a local area network operating on a port of a router, wherein the router assigns the addresses in the finite set of addresses to nodes communicating on the network.

12. The client device of claim 11 wherein the series of unicast messages is a series of transmission control protocol (TCP) messages, each of which is directed by the client device to one of the IP addresses in the finite set of addresses, and wherein the subsequent communications between the client device to the server device are user datagram protocol (UDP) messages.

13. A media player device comprising: a hardware interface to communicate via a network, wherein the network is configured with a finite set of exactly 253 internet protocol (IP) addresses assignable to nodes communicating via the network, and wherein one of the 253 IP addresses is assigned to the media player device; a memory configured to store computer-executable instructions comprising a media player application; and a processor configured to execute the computer-executable instructions stored by the memory to: initially locate the server device configured to provide a media stream to the media player application by transmitting, from the client device, a series of 252 unicast messages on the network, wherein each of the series of unicast messages is sent to a different one of the finite set of IP addresses but to the same predetermined port number associated with the server device; receive, by the media player device, a response to the series of unicast messages from the server device, wherein the server device operates on the common network using one of the 253 different IP addresses on the network, and wherein the response identifies the address on the common network of the server device; and subsequently communicate with the server device on the common network using the identified one of the 253 different IP addresses on the common network.

14. The media player device of claim 13 wherein the network is a local area network operating on a port of a router, wherein the router assigns the addresses in the finite set of addresses to nodes communicating on the network.

15. The media player device of claim 14 wherein the series of unicast messages is a series of 252 transmission control protocol (TCP) messages directed to one of the IP addresses in the finite set of 253 addresses, and wherein the subsequent communications between the media player device to the server device are user datagram protocol (UDP) messages.

* * * * *